Feb. 22, 1949.  H. P. SPARKES  2,462,139
THERMALLY EQUALIZED CYLINDER CONSTRUCTION
Filed Feb. 27, 1945  2 Sheets-Sheet 1
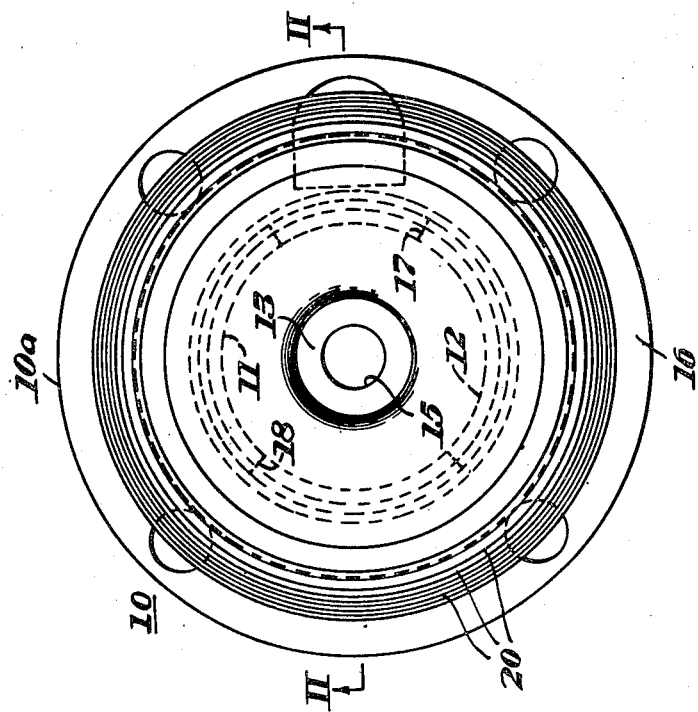
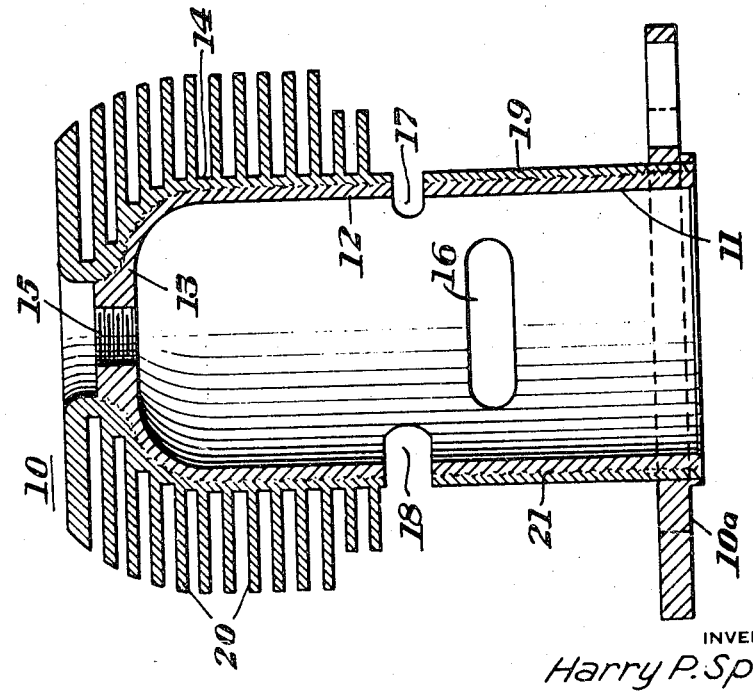
INVENTOR
Harry P. Sparkes
by his attorneys Feb. 22, 1949.　　　　H. P. SPARKES　　　　2,462,139
THERMALLY EQUALIZED CYLINDER CONSTRUCTION
Filed Feb. 27, 1945　　　　　　　　　　　2 Sheets-Sheet 2
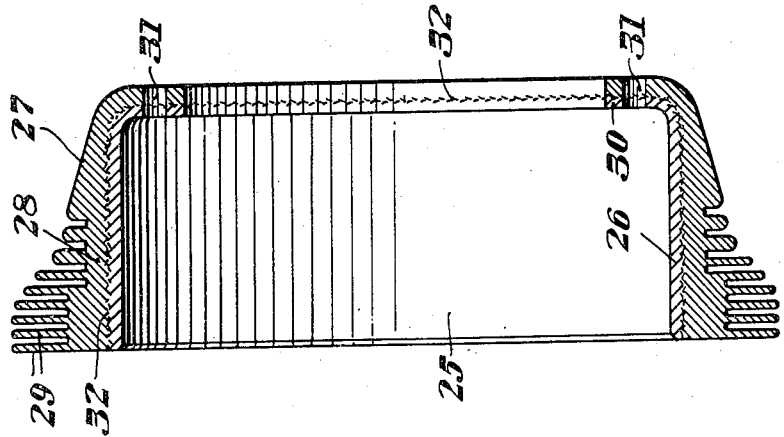
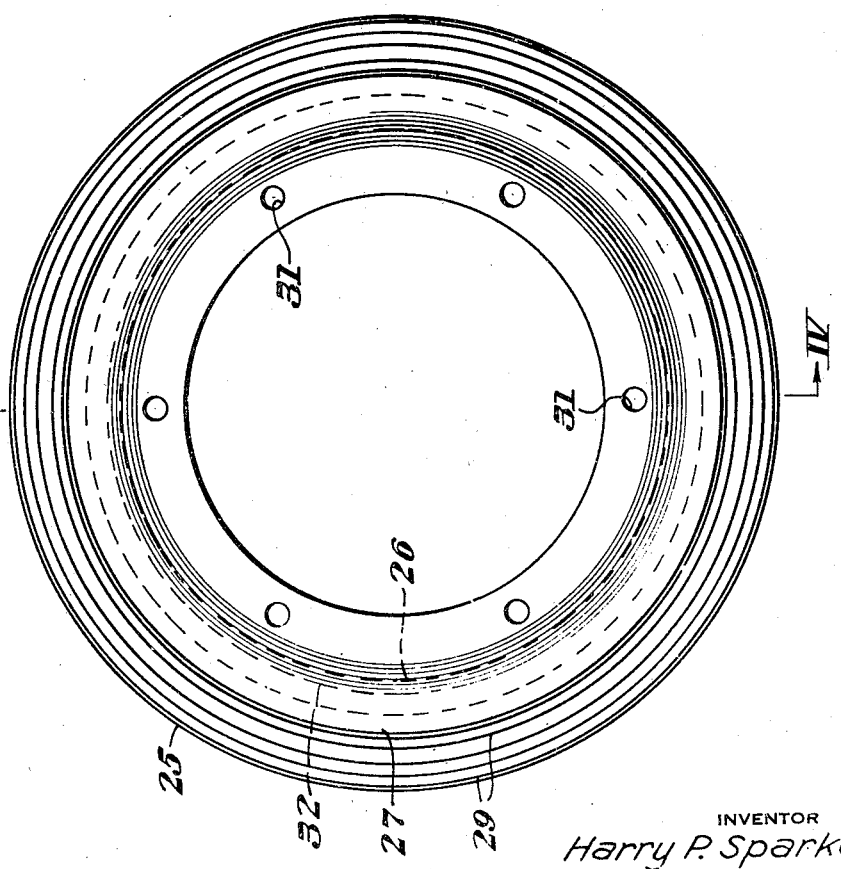
INVENTOR
Harry P. Sparkes Patented Feb. 22, 1949

2,462,139

UNITED STATES PATENT OFFICE 2,462,139

THERMALLY EQUALIZED CYLINDER CONSTRUCTION

Harry P. Sparkes, West Orange, N. J., assignor to Spar-Holl Manufacturing Company, Glassport, Pa., a corporation of Pennsylvania Application February 27, 1945, Serial No. 579,925

4 Claims. (Cl. 309—2)

This invention relates to a cylinder or like object of metal subject to heat in use, and particularly to provisions for preventing distortion and stresses as a result of thermal differentials.

Metal cylinders have numerous engineering applications in which they are subject to heat. In certain of such applications, distortion of the cylinder as a result of unequal heating is very serious. In the case of engine cylinders, it results in increased wear of the side walls and fatigue failure of the head; in the case of brake drums it causes irregular action. Distortion is caused by differential expansion between various parts of the cylinder. No matter how accurately a cylinder may be machined and finished, distortion on heating occurs and the extent thereof has been found to greatly exceed the usual manufacturing tolerances. Efforts have been made heretofore to limit the expansion of cylinders subject to heat under operating conditions by special provisions for dissipating heat rapidly therefrom. For example, cylinders have been provided with jackets of metal of high thermal conductivity having fins affording increased surface area for contact with cooling fluid. Such cooling jackets as have been proposed heretofore, however, have not only failed to achieve the desired result but have caused further complications.

Considering a cylinder for an internal-combustion engine, for example, there are several types of distortion which may result from differential expansion, any of which is serious because of the resulting reduction in the life of the cylinder. In the first place, a cylinder of steel having cooling fins of copper thereon, such as shown in Kettering Patent 1,668,508, exhibits what is referred to as "washboarding," i. e., the appearance of corrugations caused by the fact that the portions of the cylinder wall adjacent the fins run cooler than the portion between fins, and expand less. The ridges are worn off by the piston and rings and, when the cylinder is cold, show up as grooves which are readily perceptible to the touch and eye.

Further differential expansion may occur longitudinally between the portions of the cylinder wall in which the inlet and outlet ports are positioned. The wall adjacent the inlet port is subject to the cooling effect of the entering fuel while the outlet port is subject to the temperature of the exhaust gases. A similar differential longitudinal expansion results from the fact that the cooling fluid usually flows around the exterior of the cylinder from one side to the other and the cooling effect is obviously greater on that side on which the fluid first impinges. These differential longitudinal expansions introduce a slight bow or curve into the cylinder axis which further distorts the cylinder by causing a slight flattening thereof.

My prior Patent 2,176,773 discloses a composite cylinder and method of making it but the invention thereof is the result of an attempt to provide better dissipation of heat rather than any fundamental redistribution. Merely improving the cooling efficiency, however, does not prevent the difficulty arising from distortion and may even increase it. The method of my prior patent, furthermore, causes the solution of a substantial amount of the copper from the jacket in the metal of the liner throughout a large portion of the total sectional area of the cylinder wall, thereby materially impairing the thermal conductivity of the jacket.

I have invented a novel cylinder for various engineering applications subject to heat, which greatly reduces or, for all practical purposes, eliminates differential expansion and the resulting distortion. My invention is not based on the simple theory of rapidly dissipating heat from the cylinder but on the principle of equalizing the temperatures of all increments of area on the cylinder wall so that any expansion occurring is substantially the same in all directions. My invention comprises a composite metal cylinder capable of remaining substantially constant in shape throughout a wide range of temperatures, including a cylindrical liner having a substantial wall thickness and a jacket thereon. The liner is composed of wear-resistant metal having a thermal conductivity which is low compared to that of the metal of the jacket, and its wall is continuous and unbroken. The jacket includes a plurality of spaced cooling fins, and an equalizing blanket integral with said fins, overlying the liner and constituting a temperature levelling hood thereon. The fins and the blanket are essentially copper substantially free from iron, the blanket being bonded to the liner by an intermediate layer of an alloy of copper with the metal of the liner fused into both the blanket and liner. The bonding layer, the liner, the blanket and fins constitute an integral cylinder characterized by substantial freedom from local overheating and the distortion resulting therefrom. The consequence of this arrangement is that blanket thermally "short-circuits" any points on the liner which may tend to run at different temperatures and provides a low-resistance path for heat flow therebetween, in parallel with the direct path through the liner wall proper, thus limiting the difference between the temperatures at various points to insignificant amounts thereby eliminating differential expansion.

Further details of manufacture and the advantages of my invention will be fully explained hereinbelow by describing two forms of a preferred embodiment illustrated in the accompanying drawings. In the drawings, Figure 1 is a plan view of an engine cylinder according to my invention;

Figure 2 is a section therethrough along the plane of line II—II of Figure 1;

Figure 3 is a plan view of a brake drum embodying the invention; and

Figure 4 is a section therethrough on the plane of line IV—IV of Figure 3.

Referring now in detail to the drawings, and, for the present, to Figures 1 and 2 particularly, a cylinder for an internal-combustion engine indicated generally at 10, comprises a cylindrical liner 11 of steel or the like including a side wall 12 and an integral head 13, with a jacket 14 of copper or the like entirely overlying both the side wall and the head. The wall and head of the liner have a substantial thickness, e. g., approximately .1". The head 13 has a central hole 15 tapped to receive the usual spark plug. An attaching flange 10a is welded or mechanically attached to the inner end of the cylinder whereby it may be secured to the crankcase of the engine in the known manner. The cylinder 10, as illustrated, is of the type suited for a two-cycle, air-cooled engine, having a fuel-charging port 16, a fuel-inlet port 17 and an exhaust port 18 disposed generally opposite each other in the side wall. It will be understood, of course, that the invention is also applicable to cylinders for internal-combustion engines of other types, differing in detail from the cylinder illustrated, e. g., cylinders having removable heads instead of the integral head shown.

The jacket 14 comprises a blanket 19 having circumferential fins 20 spaced axially thereof throughout a portion of the cylinder. The liner 12, although described as composed of steel, may be of any other suitable metal having a hardness and resistance to wear equal or superior to that of steel. Similarly, the jacket 14 may be composed of any suitable metal or alloy having a thermal conductivity much greater than that of the metal comprising the liner. Copper or copper alloys principally or largely of copper are preferred for the jacket because of the relatively high thermal conductivity exhibited thereby. As illustrated, the blanket 19 is continuous over the entire exterior of the cylinder, being interrupted only at the ports 16, 17 and 18 and adjacent the hole 15 for the spark plug. It thus constitutes a temperature-equalizing hood affording a low-resistance path between any two points on the liner wall or head of different temperatures, in parallel with the path through the wall of the liner.

The blanket 19 is united with the liner 11 by an intermediate layer 21 composed of an alloy of copper with the metal of which the liner is composed. The jacket is preferably applied to the liner by placing the latter, heated to a temperature of about 1900 degrees F., in a suitable mold, and pouring molten copper around it. The copper thus forms a fusion weld with the metal of the liner as a result of the alloying of the two metals in the layer 21. This layer is of substantial thickness but its thickness is small compared to that of the blanket 19. Since the alloying of the blanket metal with the liner metal is limited to the layer 21, the greater portion of the thickness of the blanket is free from contamination by iron, for example, if the liner 12 is of steel, so that its thermal conductivity is not impaired. The layer 21 constitutes a firm continuous mechanical bond uniting the jacket with the liner and producing an integral unitary cylinder.

When the integral composite cylinder described above is installed in an internal-combustion engine, the liner 11, of course, is well adapted to resist wear caused by the sliding of the rings of the piston reciprocating therein. The blanket 19 provides a path of high thermal conductivity between any two incremental areas of the wall 12 or head 13 between which a difference of temperature might tend to develop. Should the temperature at any point tend to rise, heat flows therefrom through the blanket 19 to any other areas of the cylinder wall having a lower temperature, thereby practically preventing any differential expansion. This is in accordance with the thermal analogy to Ohm's law, which has now been thoroughly established. It is to be noted that this action, far from simply cooling parts of the cylinder, actually causes certain parts to operate at a temperature higher than would otherwise be the case. The portion of the blanket 19 adjacent the inner end of the cylinder, for example, receives heat from that portion surrounding the head 13 which is subjected to the maximum temperature of the explosion caused by ignition of the fuel charge. The blanket also serves to equalize the temperature of the inlet port 17 with that of the exhaust port 18 by causing heat to flow from the latter to the former, the inlet port normally tending to operate at a lower temperature, because of the cooling effect of the entering fuel. This reduces erosion of the edges of the exhaust port which occurs when the latter operates at an excessive temperature. By this equalization of the temperature of various parts of the cylinder, the possibility of differential expansion either radially or longitudinally is reduced to a minimum, if not eliminated, for all practical purposes. Theoretically, a Carnot-cycle engine operates on adiabatic expansion during a portion of its cycle. By equalizing the temperatures of all portions of a cylinder, it is possible to operate at a higher temperature and therefore a higher efficiency. This is a practical possibility because of high-temperature alloys now available. This added heat capacity can be used to materially increase the compression ratio of the engine.

Figures 3 and 4 illustrate the application of the invention to a brake drum or cylinder indicated generally at 25. In certain applications, brake drums are subjected to extreme temperatures even higher than those of the cylinder of an internal-combustion engine, and differential expansion is, therefore, a very serious problem, because of the concentration of wear on the braking surfaces upon deformation or distortion of the drum. As shown in the drawings, the drum 25 comprises a liner 26 of steel or the like and a jacket 27 thereon including a blanket 28 and circumferential fins 29 spaced axially adjacent one end. The other end of the liner has an inturned flange 30 provided with holes 31 whereby it may be attached to a wheel disc. The blanket 28 preferably extends inwardly over the flange 30 as illustrated. The interior of the liner 26 affords a braking surface adapted to be engaged by the shoes of a conventional internal expanding brake. The blanket 27 is united to the liner 26 by an alloy layer 32 similar to that shown at 21, the blanket being formed by pouring molten copper or copper alloy around the liner with the resultant alloying of the copper with the outer surface layer of the liner metal.

The liner 26 and blanket 27 perform functions similar to those of the liner 11 and blanket 19 of the cylinder 10. The liner 26 because of its nature, withstands the wear caused by the friction of the brake shoes on the interior of the liner while the blanket 27 equalizes the temperature of all portions of the liner, minimizing or precluding differential expansion of the cylinder or drum as a whole.

It will be apparent from the foregoing that my invention provides a cylinder for various engineering applications subject to heat, having many advantages over the cylinders known previously. The reduction of temperature differences practically eliminates differential expansion and the resultant distortion or deformation. This prevents excessive wear which would otherwise occur. Cylinders according to my invention, furthermore, may readily be manufactured by known methods at reasonable cost. The cylinders may also be finished to high degrees of precision with the assurance that the advantage of accurate finishing will not be lost by distortion resulting from differential expansion.

The use of copper for the equalizing blanket gives rise to a further advantage. When the molten copper is poured around the steel liner, the latter is heated above the temperature of recrystallization. The rapid freezing of the copper resulting from its high thermal conductivity has a quenching effect on the steel liner and gives it a desirable hardness. The copper jacket also insures that the rate of cooling is the same in all parts of the liner, thereby making the hardness characteristic uniform throughout the liner. To this end, the liner should be of uniform thickness throughout within relatively close tolerances.

A brake drum, such as that illustrated, exhibits practically no distortion even after repeated application of the brakes under excessive loads. The maximum change of inside diameter due to expansion and contraction in addition to wear, is insignificant, and this change occurs without any perceptible departure from true cylindrical shape.

Although I have illustrated but two forms of the invention, it may be otherwise embodied without departing from the spirit thereof or the scope of the appended claims.

I claim:

1. A composite metal cylinder of the type having an inner working surface adapted for sliding contact with a coacting machine element and subject in use to high temperature at the working surface, comprising a ferrous inner cylinder of substantially uniform wall thickness and having a bore which provides said working surface, said inner cylinder being continuous and imperforate in at least the zone of sliding contact, a cuprous blanket surrounding the inner cylinder in a substantially uninterrupted manner, and an intermediate layer, the intermediate layer being thin as compared to the thickness of the blanket, the intermediate layer constituting a fusion weld between the inner cylinder and the blanket and uniting them into an integral unitary cylinder, the blanket being substantially iron-free and constituting a temperature levelling hood, the composite cylinder being characterized by substantial fredom from local overheating and distortion resulting therefrom.

2. A cylinder as defined by claim 1 characterized by circumferential fins spaced axially of said blanket and integral therewith.

3. A composite metal cylinder of the type having an inner working surface adapted for sliding contact with a coacting machine element and subject in use to high temperature at the working surface, comprising a ferrous inner cylinder of substantially uniform wall thickness and having a bore which provides said working surface, a cuprous blanket surrounding the inner cylinder in a substantially uninterrupted manner, an inlet port for admitting fuel gases and an outlet port for exhausting combustion gases, said ports extending through the ferrous portion and blanket intermediate the ends of the cylinder, and an intermediate layer, the intermediate layer being thin as compared to the thickness of the blanket, the intermediate layer constituting a fusion weld between the inner cylinder and the blanket and uniting them into an integral unitary cylinder, the blanket being substantially iron-free and constituting a temperature levelling hood serving to minimize the difference between the temperatures of portions of the cylinder adjacent said ports resulting from the cooling effect of the incoming fuel gases, the composite cylinder being characterized by substantial freedom from local overheating and distortion resulting therefrom.

4. A composite metal cylinder of the type having an inner working surface adapted for sliding contact with a coacting element and subject in use to high temperature at the working surface, comprising a ferrous inner cylinder of substantially uniform wall thickness and having a bore which provides said working surface, said inner cylinder being continuous and imperforate in at least the zone of sliding contact, a cuprous blanket surrounding the inner cylinder in a substantially uninterrupted manner, and an intermediate layer, the intermediate layer being thin as compared to the thickness of the blanket, the intermediate layer constituting a fusion weld between the inner cylinder and the blanket and uniting them into an integral unitary cylinder, the blanket constituting a temperature levelling hood and containing so little iron that the composite cylinder is characterized by substantial freedom from local overheating and distortion resulting therefrom.

HARRY P. SPARKES.

REFERENCES CITED

The following references are of record in the file of this patent:

UNITED STATES PATENTS

| Number | Name | Date |
|---|---|---|
| 758,373 | Marsh et al. | Apr. 26, 1904 |
| 814,491 | Westerman | Mar. 6, 1906 |
| 817,543 | Bole | Apr. 10, 1906 |
| 1,311,242 | Norton | July 29, 1919 |
| 1,341,227 | Diamond | May 25, 1920 |
| 1,528,947 | Preston | Mar. 10, 1925 |
| 2,012,739 | Brown | Aug. 27, 1935 |
| 2,062,394 | Brown | Dec. 1, 1936 |

FOREIGN PATENTS

| Number | Country | Date |
|---|---|---|
| 122,772 | Great Britain | 1919 |